United States Patent [19]

Task et al.

[11] Patent Number: 4,707,696
[45] Date of Patent: Nov. 17, 1987

[54] PORTABLE GLIDE SLOPE INDICATOR

[75] Inventors: Harry L. Task, Dayton, Ohio; Ivan S. Wyatt, Gilbert, Ariz.

[73] Assignee: The United States of America as represented by the Secretary of the Air Force, Washington, D.C.

[21] Appl. No.: 823,872

[22] Filed: Jan. 29, 1986

[51] Int. Cl.⁴ .............................................. G08G 5/00
[52] U.S. Cl. .................................. 340/954; 73/178 T; 244/114 R; 340/947; 340/955
[58] Field of Search ............... 340/947, 948, 952–956, 340/976, 950; 73/178 R, 178 T; 343/5 LS, 5 GC; 364/428, 434; 362/62; 244/114 R; 342/33, 34

[56] References Cited

U.S. PATENT DOCUMENTS

| | | | |
|---|---|---|---|
| 2,280,126 | 4/1942 | Metcalf | 177/352 |
| 2,431,240 | 11/1947 | Gausch | 340/955 |
| 2,458,414 | 1/1949 | Penton | 340/955 |
| 2,549,860 | 4/1951 | Swanson | 343/108 |
| 3,012,224 | 12/1961 | Ferguson | 340/955 |
| 3,138,770 | 6/1964 | Murray, Jr. et al. | 340/26 |
| 3,183,479 | 5/1965 | Austin | 340/26 |
| 3,191,146 | 6/1965 | Mitchell | 340/26 |
| 3,412,377 | 11/1968 | Perry | 340/26 |
| 3,447,129 | 5/1969 | Birmingham et al. | 340/955 |
| 3,610,930 | 10/1971 | Lacy | 250/83.3 |
| 3,701,969 | 10/1972 | Lambert et al. | 340/953 |
| 3,885,876 | 5/1975 | Konopka | 340/955 |
| 4,170,767 | 10/1979 | Tanner | 340/955 |
| 4,430,695 | 2/1984 | Payne et al. | 340/954 |
| 4,532,512 | 7/1985 | Tanner | 340/954 |
| 4,554,544 | 11/1985 | Task | 340/947 |
| 4,590,471 | 5/1986 | Pieroway et al. | 340/947 |

*Primary Examiner*—James L. Rowland
*Assistant Examiner*—Brent A. Swarthout
*Attorney, Agent, or Firm*—Bobby D. Scearce; Donald J. Singer

[57] ABSTRACT

An improved glide slope indicator system for facilitating aircraft landings under adverse lighting conditions on remote or austere landing sites is provided which comprises a pair of indicators deployable near ground level on each side of a runway, each indicator including a housing having an optical window and a pair of light sources mounted in predetermined spaced relationship to each other and to the optical window and connected to a power source and related circuitry to project a well defined first blinking and second steady light beam of predetermined angular divergence and overlap, one indicator disposed to project beams with an overlap elevated at a first angle relative to horizontal and the other indicator disposed to project beams with an overlap elevated at a second angle relative to horizontal different from the first, with a preselected glide path lying between the two overlaps. An infrared filter may be included in each indicator to project beams observable only with infrared sensitive viewing aids. The system may be battery powered for portability.

7 Claims, 5 Drawing Figures

PORTABLE GLIDE SLOPE INDICATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical guidance systems for providing visual cues of glide slope location to aircraft, and more particularly to a novel portable landing aid for providing glide slope information to aircraft under adverse lighting conditions at austere landing sites.

The present invention provides a portable glide slope indicator including a pair of light sources, one projecting a steady beam and one projecting a blinking beam. A pair of indicators deployed at the end of a runway provide accurate and easily interpretable visual glide slope information, whereby the pilot of an incoming aircraft may easily determine the position of the aircraft relative to a preselected glide path. The glide slope indicator of the invention may include filters to project infrared light beams observable with night vision aids. The indicator has particular utility for assisting aircraft landings on austere runways at night with or without infrared night vision assistance.

It is, therefore, a principal object of the invention to provide an improved aircraft glide slope indicator.

It is a further object of the invention to provide a portable glide slope indicator system for beaming visual glide slope information to aircraft.

It is yet another object of the invention to provide a glide slope indicator system for visually defining glide path location observable with infrared sensitive vision aids for night landings.

It is yet another object of the invention to provide a portable glide slope indicator system to facilitate aircraft landings on austere landing sites.

These and other objects of the present invention will become apparent as the detailed description of certain representative embodiments thereof proceeds.

SUMMARY OF THE INVENTION

In accordance with the foregoing principles and objects of the present invention, an improved glide slope indicator system for facilitating aircraft landings under adverse lighting conditions on remote or austere landing sites is provided which comprises a pair of indicators deployable near ground level on each side of a runway, each indicator including a housing having an optical window and a pair of light sources mounted in predetermined spaced relationship to each other and to the optical window and connected to a power source and related circuitry to project a well defined first blinking and second steady light beam of predetermined angular divergence and overlap, one indicator disposed to project beams with an overlap elevated at a first angle relative to horizontal and the other indicator disposed to project beams with an overlap elevated at a second angle relative to horizontal different from the first, with a preselected glide path lying between the two overlaps. An infrared filter may be included in each indicator to project beams observable only with infrared sensitive viewing aids. The system may be battery powered for portability.

DESCRIPTION OF THE DRAWINGS

The present invention will be more clearly understood from the following detailed description of representative embodiments thereof read in conjunction with the accompanying drawings wherein.

DETAILED DESCRIPTION

Figure 1:
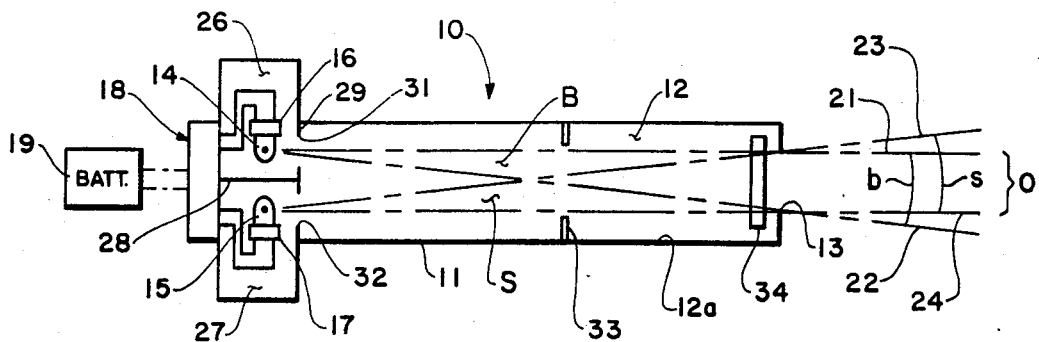
FIG. 1 is a schematic side view in axial section of a glide slope indicator of the present invention.

Referring now to FIG. 1 of the drawings, shown therein is a side view in section of an indicator 10 of the present invention. Indicator 10 comprises a housing 11 of predetermined size and shape defining an interior chamber 12, and means defining an optical window, aperture or other optical opening 13 of predetermined height and width at a first end thereof through which a pair of light beams (one blinking and one steady) are projected as hereinafter described. A pair of light sources such as incandescent bulbs 14,15 are mounted within housing 11 near the second end substantially as shown in FIG. 1 and installed in receptacles 16,17 operatively connected to a blinking circuit 18 and to a suitable source of power, such as portable battery pack 19 or the like, which may be integral with or separately attachable to circuit 18 and housing 11.

Bulbs 14,15 are fixedly supported by suitable means within housing 11 in spaced relationship to each other, substantially as shown in FIG. 1, so that the light emitted by bulb 14 is spatially defined by opening 13 as a beam of light B of predetermined vertical and horizontal angular divergences such as that schematically represented in the vertical plane between broken lines 21,22 drawn from the filament of bulb 14 through the respective edges of housing 11 defining opening 13. Similarly, a beam of light S emitted by bulb 15 is defined in the vertical plane between broken lines 23,24 drawn from the filament of bulb 15 to the edges of opening 13. The intensity of bulbs 14,15 is selected depending upon the intended range of visibility of indicator 10.

Housing 11 and opening 13 therein are sized and configured and the positions of bulbs 14,15 within housing 11 and the spacing between bulbs 14,15 are selected (corresponding to the size of opening 13) to project beams B,S having respective predetermined angular divergences b,s in the vertical plane. Width of opening 13 is selected to provide desirable horizontal beam divergence defining an azimuthal sector in which beams B,S are observable. Intensity of bulbs 14,15 may be selected depending on the range of visibility intended for indicator 10. The various components of indicator 10 are preferably sized and arranged so that the upper limit of beam B defined by broken line 21 is substantially parallel to the bottom limit of beam S defined by broken line 24, and the fixed overlap O of beams B,S defined between lines 21,24 is of predetermined (preferably minimal) size defined substantially by the vertical dimension (O) of opening 13 in housing 11.

In order to project a pair of beam B,S having optimum definition, bulbs 14,15 may preferably be housed within respective chambers 26,27 defined within housing 11 by partitions 28,29 to isolate bulbs 14,15 from each other to avoid interference between light emitted from the two bulbs. Partition 29 accordingly includes a pair of apertures 31,32 of appropriate size which, in cooperation with optical opening 13 define beams B,S. A light baffle 33 may be included within housing 11 along the interior surface thereof, substantially as shown in FIG. 1, to block specular light reflection from the interior housing 11 surfaces. Further, the interior surfaces 12a of housing 11 defining chamber 12 may comprise a coated or painted layer of light absorbing material, such as flat black paint, black felt, black velvet, or the like. Housing 11 may comprise any suitable material of construction such as plastic, steel, aluminum, or composite, and may be of any suitable size for the purposes herein described. It is, however, preferable that the weight and dimensions of indicator 10 be minimized for the purpose of portability, consistent with the accomplishment of those purposes. Accordingly, an indicator 10 built in demonstration of the invention comprised a housing 11 of aluminum with overall dimensions of about 4×6×8 inches, including a spacing between bulbs 14,15 of one inch, and an opening 13 one inch high by 1.5 inches wide which provided beams B,S having an overlap in the vertical plane of about one inch.

It may be desirable for beams B,S to be detectable only using selected vision aids, such as infrared sensitive night vision goggles. Accordingly, infrared filter 34 may be included within housing 11 near opening 13, substantially as shown in FIG. 1.

Blinking and power supply circuit 18 may comprise any suitable circuitry apparent to one with skill in the applicable art which may be used to power bulbs 14,15 and to cause one of the bulbs to blink at a predetermined controllable rate, the embodiment depicted herein arranged for bulb 14 to emit a blinking (B) beam and bulb 15 to emit a steady (S) beam. Circuit 18 construction is therefore not limiting of the invention herein, and should provide a blinking frequency to bulb 14 at a moderate predetermined frequency. For optimum visibility of the blinking of beam B, the frequency may preferably be in the range of about ½ to 2 Hz although such frequency range is not limiting of the invention herein. In a unit built and successfully tested in demonstration of the invention, a frequency of 1.0 Hz was used.

Figure 2:
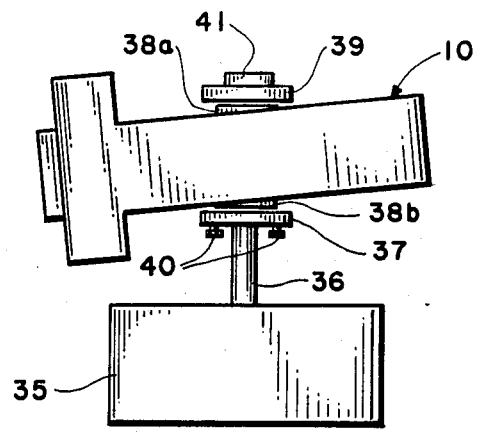
FIG. 2 is a side view of an indicator of FIG. 1 supported on a representative mounting structure to elevate the indicator at preselected angle.

Referring now to FIG. 2, shown therein is a schematic side elevational view of an indicator 10 of the present invention supported on a representative mounting for projecting beams B,S at a preselected angle. A base 35 may therefore support a post 36 and leveling table 37 on which indicator 10 is mounted. Base 35 may serve as a housing for battery pack 19. A pair of precision off-set wedges 38a,b may support indicator 10 at the approximate desired angle relative to horizontal between leveling table 37 and an upper clamp 39. Fine positioning adjustments for indicator 10 may be provided by leveling screws 40 on leveling table 37, and circular bubble level 41 mounted above indicator 10 as suggested in FIG. 2.

Figure 3:
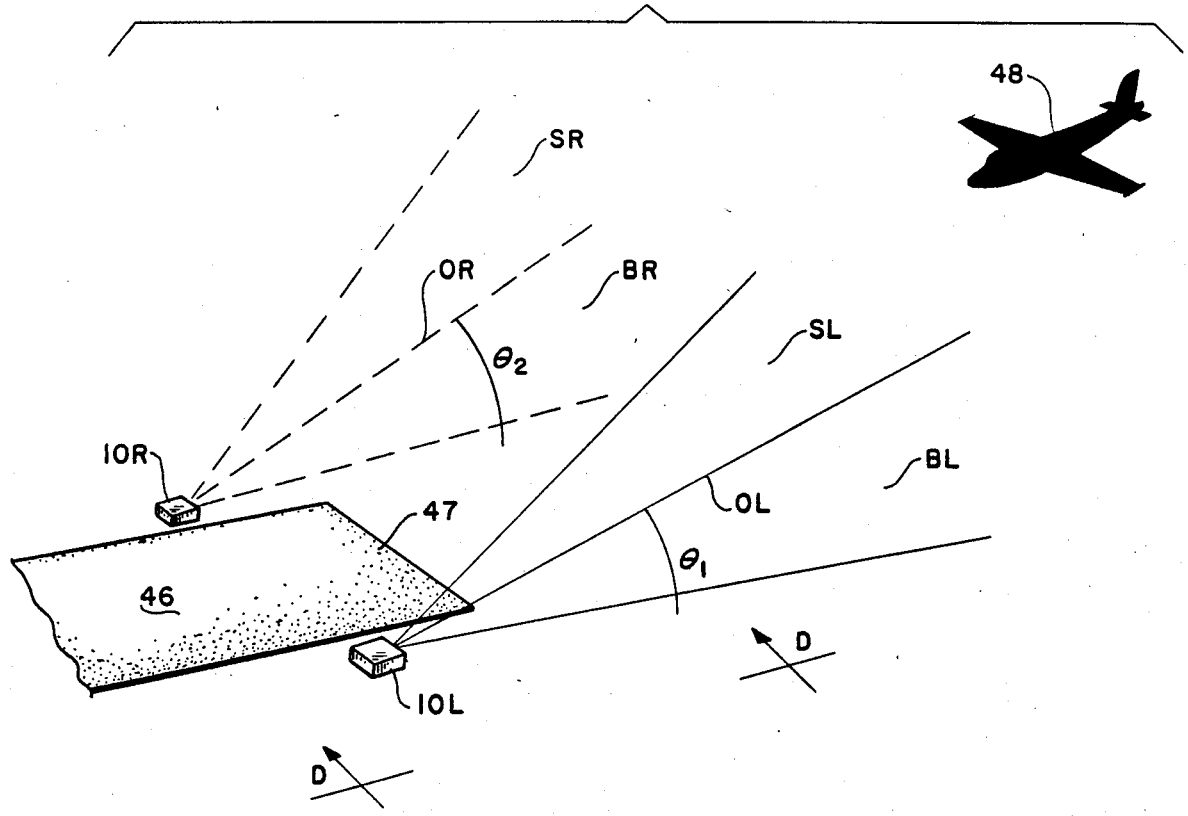
FIG. 3 is a schematic perspective view of the end of a runway with a pair of indicators in place, including legends to illustrate the principle of operation of the indicator system of the invention.

Referring now to FIG. 3, shown therein is a perspective view of the end of a runway 46 having on either side indicators 10L,10R of the type described above in relation to FIG. 1, whereby a system is defined in accordance with the present invention to provide visual glide slope information to an aircraft. A pair of indicators 10L,10R are therefore placed on the left and right sides, respectively (as viewed from an incoming aircraft), of runway 46 near threshold 47 thereof. Indicators 10L, 10R are installed near runway 46 in manner whereby two sets of blinking and steady beams are projected in the direction of incoming aircraft 48, and are otherwise substantially identical to each other except that one of the indicators 10L,10R is positioned to project a pair of light beams at slightly higher angles relative to ground level than the other. Accordingly, indicator 10L is installed to project a blinking beam BL and a steady beam SL having an overlap OL elevated at an angle $\theta_1$ with respect to ground level G. Similarly, indicator 10R is installed to project blinking and steady beams BR,SR having an overlap OR elevated at an angle $\theta_2$ with respect to ground level.

Figure 4:
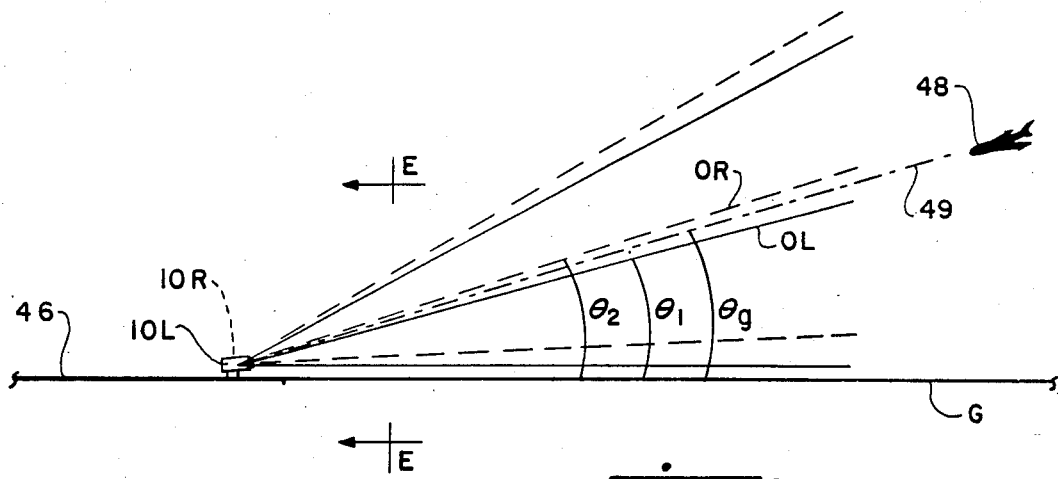
FIG. 4 is a view along line D—D of FIG. 3 showing the position of a glide slope relative to the beams projected by each indicator.

Referring additionally now to FIG. 4, shown therein is a view along line D—D of FIG. 3, including superimposition of beams SR,BR,SL,BL. As indicated above, one indicator (10R in the example given in FIG. 3) projects beams at a slightly higher angle than the other, and, according, $\theta_2$ is somewhat larger than $\theta_1$. In the use of the invention herein as a glide slope indicator system, indicators 10L,10R are installed with $\theta_2$ somewhat larger than angle $\theta_g$ defining the desired glide slope 49 for aircraft 48, and $\theta_1$ somewhat smaller than $\theta_g$. The system depicted in FIGS. 3 and 4 may be set up for any selected glide slope 49 and either indicator 10L,10R may be selected for the higher beam projection. The angular difference $\theta_2-\theta_1$ between the beam projections for indicators 10L,10R may be varied depending on the precision needed for glide slope 49 corresponding to aircraft type, runway conditions, and visibility. For example, if the available runway 46 is short or obstacles exist near glide path 49, beam projections characterized by a small $\theta_2-\theta_1$ difference may be desirable. Notwithstanding, in a system built and operated successfully in demonstration of the invention, selected $\theta_2-\theta_1$ values of from about ¼° to ½° for beam divergence angles b,s of from about 9° to 11°, and glide slope angles $\theta_g$ of from about 2½° to 3° were characteristic.

Figure 5:
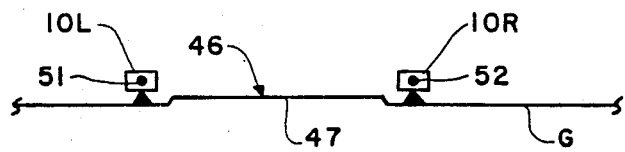
FIG. 5 is a view along line E—E of FIG. 4 illustrating a pilot's view of a pair of indicators during a landing approach.

Referring now additionally to FIG. 5, which is a view along line E—E of FIG. 4, the operation of the glide slope indicator system of the present invention may be summarized as follows. A pilot of an incoming aircraft 48 will observe two lights 51,52 between which resides threshold 47 of runway 46. If aircraft 48 is approaching on a course above a preselected glide slope 49 (i.e., above OR) both steady beams SL,SR will be observed from the respective indicators 10L,10R. If aircraft 48 is too low with respect to glide slope 49, (i.e., below OL), both blinking beams BL,BR will be observed. If, however, aircraft 48 is acceptably close to glide slope 49 (i.e., within an envelope of angular size $\theta_2-\theta_1$ between OR and OL), indicator 10L will present steady beam SL and indicator 10R will present blinking beam BR to the pilot. It is noteworthy that in reversing the positions of indicators 10R,10L with respect to runway 46, one blinking and one steady beam will still be observed from an aircraft approaching acceptably close to glide slope 49 between OL and OR.

It is instructive to note that use of a pair of indicators 10L,10R at the end of runway 46 (such as depicted in FIG. 3) does not provide precise runway bearing (azimuthal) cues to incoming aircraft 48. Runway bearing cues, if needed by an incoming aircraft, may be given separately from the glide slope cues provided by the present invention, such as by one or more runway lights deployed along the length of runway 46 or by radio signal. Notwithstanding, in the unit built in demonstration of the invention, accurate cues as to runway bearing were obtainable using the invention within about ±10° azimuth relative to true runway heading. Naked eye visibility of the invention using 12 watt incandencent bulbs without infrared filter was about 6 miles.

The present invention therefore provides a portable glide slope indicator system for aiding aircraft landing at night on an otherwise remote, austere, unit or unmarked field. It is understood that certain modifications to the invention as described may be made, as might occur to one with skill in the field of this invention, within the scope of the appended claims. Therefore, all embodiments contemplated hereunder which achieve the objects of the invention have not been shown in complete detail. Other embodiments may be developed without departing from the spirit of the invention or from the scope of the appended claims.

We claim:

1. A system for providing glide path information to an aircraft comprising:
   (a) first and second glide slope indicators for positioning near ground level near respective first and second sides of an aircraft runway, each of said first and second glide slope indicators including.
      (i) a housing having a first end and a second end;
      (ii) means defining an optical window in said housing at said first end thereof;
      (iii) first and second light sources mounted within said housing near said second end thereof, the first light source being mounted in preselected vertical spaced relationship above the second light source, each of said first and second light sources being spaced a preselected distance from said optical window so as to project respective substantially well defined first and second beams of light of preselected angular divergences and overlap from said housing through said optical window;
      (iv) a controllable source of power operatively connected to said first and second light sources for selectively energizing said first and second light sources; and
      (v) electrical means interconnecting said power source and said first light source for controllably flashing said first light source, whereby each of said first and second glide slope indicators presents a first blinking beam of light and a second steady beam of light;
   (b) said first and second glide slope indicators being disposed to project respective first and second beams of light in generally the same direction relative to said aircraft runway;
   (c) the first glide slope indicator being disposed to project said first and second beams of light thereof having a first region of overlap thereof elevated at a preselected first angle relative to horizontal; and
   (d) the second glide slope indicator being disposed to project said first and second beams of light thereof having a second region of overlap thereof elevated at a preselected second angle relative to horizontal different from said first angle, said glide path being defined along an angle defined between said first region of overlap and said second region of overlap.

2. The system as recited in claim 1 wherein said first and second light sources of each of said first and second glide slope indicators comprise incandescent bulbs.

3. The system as recited in claim 1 further comprising an infrared filter disposed between said first and second light sources and said optical window of each of said first and second glide scope indicators.

4. The system as recited in claim 1 wherein for said each of said first and second glide slope indicators the size of said optical window and the spacing between said first and second light sources and said optical window are preselected to project said first and second beams of light having angular divergences of from about 9° to about 11°.

5. The system as recited in claim 1 wherein said power source of each of said first and second glide slope indicators comprises a battery.

6. The system as recited in claim 1 wherein the flashing frequency of said first light source of each of said first and second glide slope indicators is from about ½ to about 2 Hz.

7. The system as recited in claim 1 wherein each of said first angle and said second angle is from about 2° to about 6° and wherein the angular difference between said first angle and said second angle is from about ¼° to about ½°.

* * * * *